(12) United States Patent
Steenackers et al.

(10) Patent No.: US 6,173,800 B1
(45) Date of Patent: *Jan. 16, 2001

(54) EXHAUST SYSTEM FOR A MOTOR VEHICLE AND MOTOR VEHICLE

(75) Inventors: Pieter Delfina Steenackers, Heverlee; John W. Jöorg Alexnat, Vliermaal, both of (BE)

(73) Assignee: Scambia Industrial Developments AG, Schaan (LI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/067,504

(22) Filed: Apr. 27, 1998

(30) Foreign Application Priority Data

Apr. 28, 1997 (CH) .................................................. 988/97

(51) Int. Cl.⁷ ........................................................ B60K 13/04
(52) U.S. Cl. ........................ 180/89.2; 180/296; 248/58; 248/634
(58) Field of Search .................................. 248/634, 638, 248/317, 58, 60; 180/89.2, 309, 296

(56) References Cited

U.S. PATENT DOCUMENTS

| | | | |
|---|---|---|---|
| 3,745,632 | * | 7/1973 | Malkki et al. . |
| 4,159,043 | * | 6/1979 | James .................................. 180/296 |
| 4,345,430 | * | 8/1982 | Pallo et al. ............................... 60/282 |
| 4,658,581 | * | 4/1987 | Hirabayashi ........................... 60/322 |
| 5,069,487 | * | 12/1991 | Sheppard ............................... 285/226 |
| 5,101,886 | * | 4/1992 | Zacharias et al. ....................... 165/51 |
| 5,103,943 | * | 4/1992 | Ide et al. ............................... 188/306 |
| 5,170,147 | * | 12/1992 | Graffagno et al. ................... 340/449 |
| 5,195,607 | | 3/1993 | Shimada et al. . |
| 5,197,698 | * | 3/1993 | Bartholomew ......................... 248/60 |
| 5,323,989 | * | 6/1994 | Hamada et al. ........................ 248/60 |
| 5,445,241 | * | 8/1995 | Nakamura et al. ................... 180/296 |
| 5,817,991 | * | 10/1998 | Suyama et al. ....................... 181/243 |
| 5,866,079 | * | 2/1999 | Machida et al. ....................... 422/179 |

FOREIGN PATENT DOCUMENTS

| | | |
|---|---|---|
| 3137746 | 6/1983 | (DE) . |
| 0807749 | 11/1997 | (EP) . |

* cited by examiner

Primary Examiner—Brian L. Johnson
Assistant Examiner—Avraham H. Lerner
(74) Attorney, Agent, or Firm—Brown & Wood, LLP

(57) ABSTRACT

A motor vehicle has an internal combustion engine and an exhaust system with an exhaust which has two deformable pipe members and at least two casings arranged downstream thereof and belonging to a catalytic converter and/or silencer. At least the last casing, relative to the direction of flow of the exhaust gas, of the exhaust, together with the first casing, defines a straight connecting line passing through the two casings and is held on the vehicle body by means of at least partially rubber-elastic connecting members in such a way that it is deflected by a force parallel to the straight connecting line more than by a force of equal magnitude at right angles to the straight connecting line. This enables the casings to be connected to one another exclusively by rigid exhaust parts and oscillations of the second casing to be kept small.

16 Claims, 4 Drawing Sheets

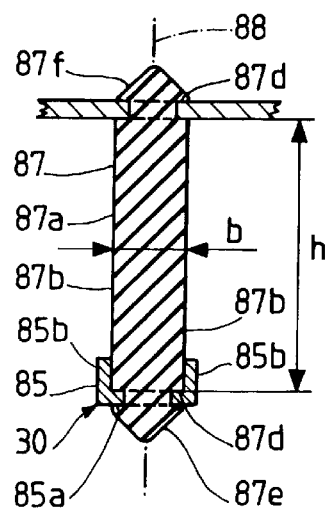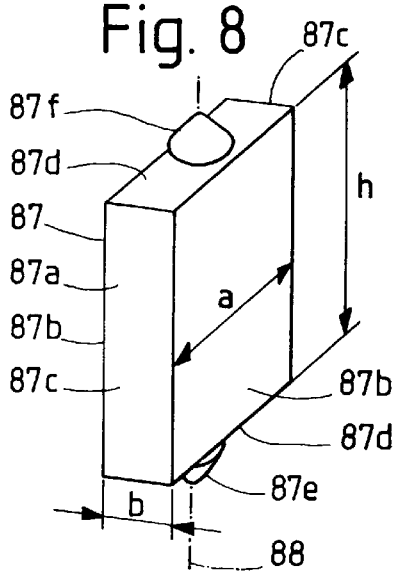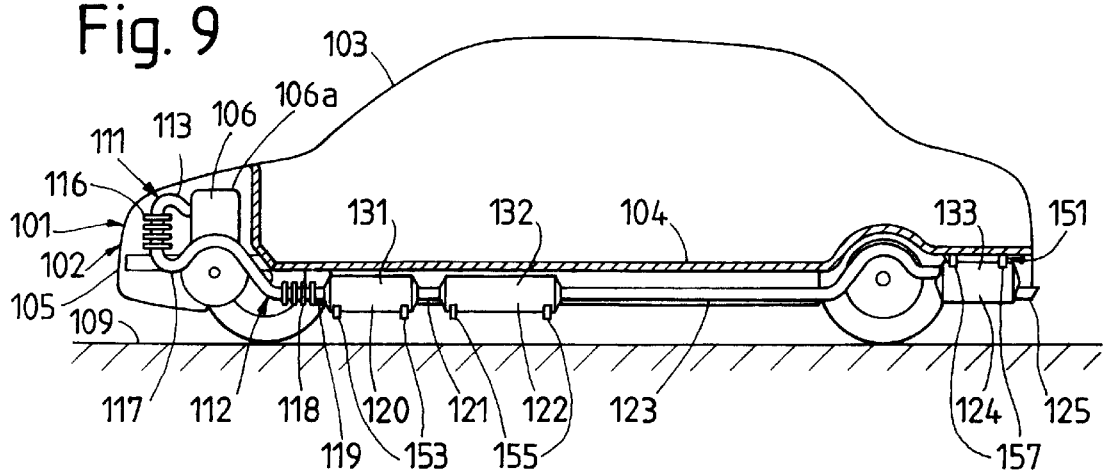

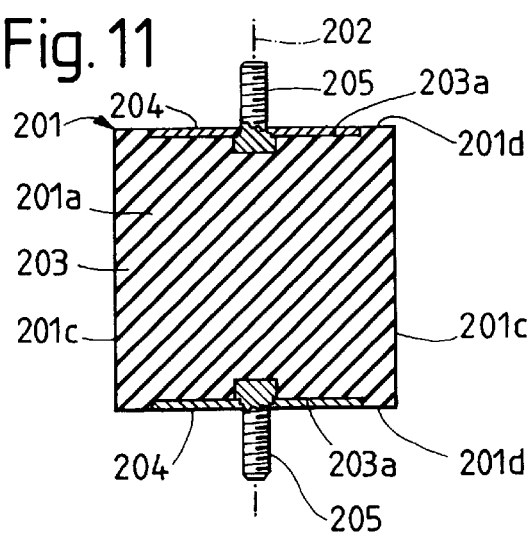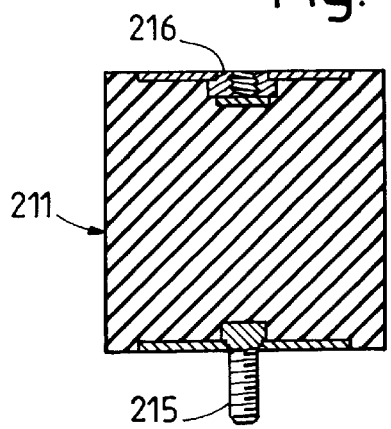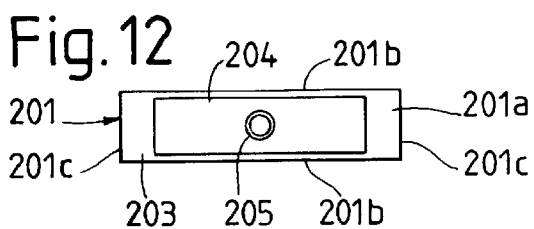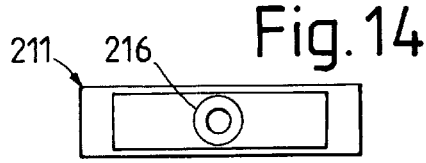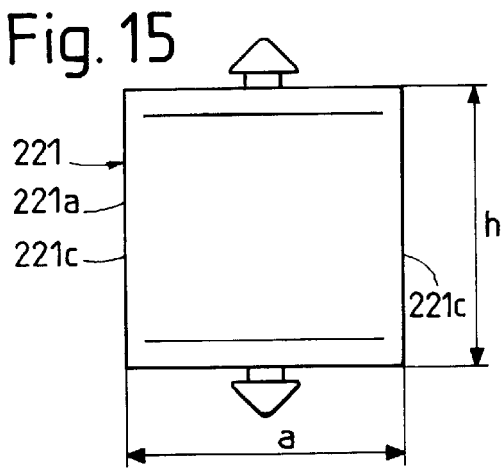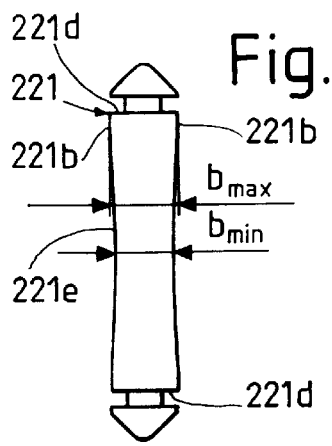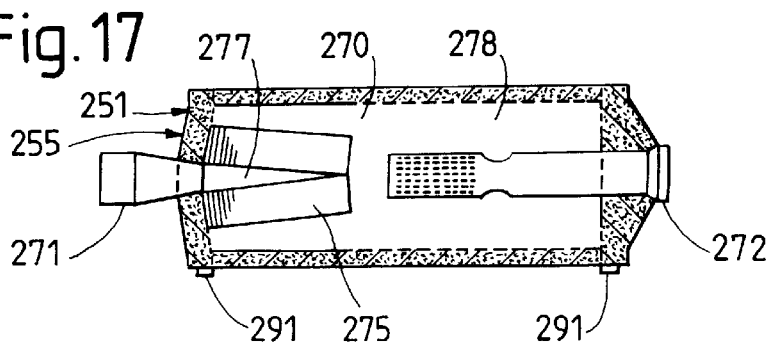

EXHAUST SYSTEM FOR A MOTOR VEHICLE AND MOTOR VEHICLE

BACKGROUND OF THE INVENTION

1. Field of the Invention

The invention relates to an exhaust system. The exhaust system is provided, for example, for a car but may also be used for another motor vehicle—for example a truck or bus The internal combustion engine may consist of a gasoline or diesel engine.

When a motor vehicle is used, the internal combustion engine generates vibrations, i.e. oscillations, of the engine casing. Furthermore, rapid changes in the power output by the engine can cause swivel movements of the engine casing about a virtual axis of rotation and/or pivot axis. The oscillatory movements and other movements of the engine casing are transmitted to the exhaust via the mechanical link between said casing and said exhaust. Moreover, the engine feeds exhaust gas to the exhaust in a pulsating manner, which exhaust gas can also generate oscillations of the exhaust. Furthermore, driving over holes and other irregularities, driving around curves and the acceleration and braking of the vehicle cause accelerations of the exhaust. The exhaust is furthermore heated by the exhaust gas during operation of the engine, the exhaust gas temperature decreasing in a direction away from the engine, along the flow path. Owing to the thermal expansion of the rigid parts of the exhaust, the heating results in a temporary lengthening of said exhaust.

2. Description of the Prior Art

An exhaust system disclosed in German Patent Application Publication 31 37 746 has an exhaust which has in succession, in the direction of flow of the exhaust gas, a pipe, a deformable pipe member, a first silencer, a deformable pipe member, a pipe, a second silencer and a pipe. Each silencer has a casing. The exhaust is held on the vehicle body by retaining means. The retaining means have suspension means with rubber rings, said suspension means engaging the pipes. Similar exhaust systems having rubber rings are also known in practice. If a force is exerted on an exhaust part held by means of rubber rings, the rubber rings first offer only a very small resistance to a deflection of the retained exhaust part from its rest position. Only when the deflections of the exhaust parts reach certain limits, which are generally 1 to 2 cm or more in practice, does the resistance generated by the rubber rings increase abruptly. The parts held by the retaining means can thus move almost freely within the ranges defined by the stated limits.

The deformable pipe members are intended to decouple silencers arranged downstream of said members and other exhaust parts from the engine with respect to vibration. Since the known exhausts and in particular their parts arranged downstream of the deformable pipe members can move fairly freely within certain limits, transverse oscillations of large amplitudes are frequently generated in the exhausts. This is the case in particular when the exhausts have resonant frequencies in the region of the fundamental oscillations generated by the engine. The oscillations and other accelerations and forces acting on the exhaust subject the pipes belonging to the exhaust, silencer casings and deformable pipe members to considerable stress. The pipes and casings of the known exhausts have thick walls. The known exhaust systems are therefore heavy. The high weight of the known exhaust systems requires a great deal of material for their manufacture, for example relatively expensive stainless steel, and in particular increases the fuel consumption during driving. Furthermore, in spite of the large wall thicknesses, the exhausts fracture fairly frequently. Since the silencers of the known exhausts are usually deflected transversely with respect to the general longitudinal direction of the exhausts, starting from their middle and/or rest position, in various transverse directions up to at least 1 cm and often up to 2 cm or more, they also require space for their transverse movements in addition to the space occupied by them. This often has the disadvantage that the silencer cannot be made as large as desirable for good silencing.

European Patent Application Publication 0 807 749 published on Nov. 19, 1997, and the corresponding U.S. patent application Ser. No. 08/853,183 (1997) proposed exhausts which have two deformable pipe members connected by a rigid pipe and two or three catalytic converter and/or silencer casings arranged downstream thereof. Furthermore, retaining means were provided for holding each of these casings relatively firmly on the vehicle in such a way that each of these casings is at most slightly displaceable in all directions and in particular in the longitudinal direction of the vehicle and hence in the general longitudinal direction of the exhaust. These retaining means make it possible considerably to reduce oscillations and other movements of the casings and of the entire exhaust and to make said exhaust thin-walled, light and nevertheless durable. However, the exhaust systems according to this proposal also have the disadvantage that expensive, deformable pipe members must be arranged between the stated, successive casings in order to compensate the changes in length which are caused during operation by the thermal expansions of rigid exhaust parts.

SUMMARY OF THE INVENTION

It is the object of the invention to avoid disadvantages of known exhaust systems and in particular to provide an exhaust system which makes it possible to keep oscillations and other movements of the last casing caused by driving as small as possible without deformable pipe members also having to be arranged between casings arranged downstream of the first deformable pipe member.

This object is achieved, according to the invention, by an exhaust system for a motor vehicle having a vehicle body and an internal combustion engine and having an exhaust which can be connected to the internal combustion engine and has at least one deformable pipe member and at least two casings arranged downstream of said pipe member, and having retaining means for holding the exhaust on the vehicle body, the first casing arranged downstream of the deformable pipe member, and the last casing, defining a straight line passing through the two casings, wherein the retaining means have connecting members which are connected to the last casing and are elastically deformable in such a manner that, in a state separated from the remaining exhaust, the last casing is deflected, relative to the vehicle body, a greater distance by a force acting on said last casing and parallel to said straight line than by a force of equal magnitude acting on said last casing and at right angles to said straight line.

The invention furthermore relates to a motor vehicle having a vehicle body, an internal combustion engine and an exhaust system, wherein the exhaust of the exhaust system is connected to the internal combustion engine and wherein each casing is held on the vehicle body via the retaining means.

BRIEF DESCRIPTION OF THE DRAWINGS

The subject of the invention is explained below with reference to examples illustrated in the drawings. In the drawings, FIG. 7 shows a section through a holder serving for holding the second silencer, along the line VII—VII of FIG. 5, on a larger scale than the latter, FIG. 8 shows an oblique view of a connecting member serving for holding the second silencer, FIG. 9 shows a diagram, analogous to FIG. 1, of a motor vehicle having another exhaust system, FIG. 10 shows a plan view of that part of the exhaust of the exhaust system shown in FIG. 9 which is located downstream of the exhaust manifold, FIG. 11 shows a section, parallel to the broader side, through a variant of another connecting member, FIG. 12 shows a plan view of the connecting member according to FIG. 11, FIG. 13 shows a section, parallel to the broader side, through another connecting member, FIG. 14 shows a plan view of the connecting member according to FIG. 13, FIG. 15 shows a view of the broader side of yet another connecting member, FIG. 16 shows a view of the narrower side of the connecting member according to FIG. 15 and FIG. 17 shows an axial section through an apparatus which forms a catalytic converter/silencer having a common casing.

DESCRIPTION OF THE PREFERRED EMBODIMENTS

Figure 1:
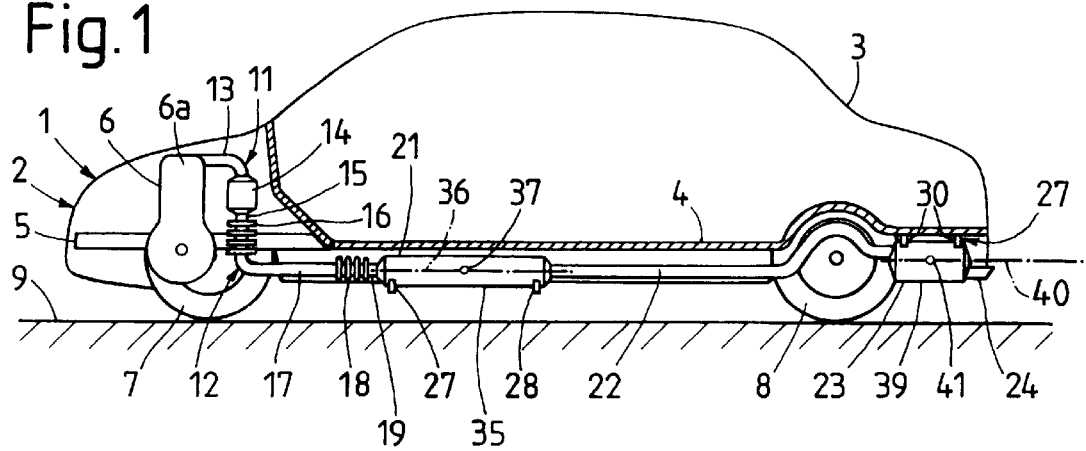
FIG. 1 shows a motor vehicle drawn schematically, partly as a view and partly as a section, together with an exhaust system.

The motor vehicle 1 shown schematically in FIG. 1 consists of a car and has a vehicle body 2. This has bodywork 3, a vehicle floor 4 and a chassis 5. The bodywork is, for example, self-supporting and also forms at least one part of the floor and/or of the chassis. The vehicle body 2 holds an internal combustion engine 6, front wheels 7 and rear wheels 8. The internal combustion engine 6 has an engine casing 6a which is fastened in a vibration-damping manner on the chassis 5 and has a plurality of exhaust gas outlets, each of which is coordinated with a cylinder of the engine. The motor vehicle 1 stands with its wheels on a horizontal driving plane 9 and has an exhaust system 11 with an exhaust 12 This is for the most part also shown in plan view in FIG. 2 and has in succession, in the direction of flow of the exhaust gas, an inlet and collecting apparatus 13, at least one catalytic converter 14, a connection 15, a first elastically deformable pipe member 16, a bent pipe 17, a second elastically deformable pipe member 18, a connection 19 which may have a short pipe, a first silencer 21, a relatively long, bent pipe 22, a second silencer 23 and an outlet formed by a pipe 24 and opening into the environment. The internal combustion engine 6 is located at the front end of the motor vehicle 1. The exhaust 12 runs from the internal combustion engine 6 to the rear of the vehicle and is located to a large extent underneath the vehicle floor 4. Retaining means 27 furthermore belong to the exhaust system 11. Said retaining means have four holders 28, 30 which connect the two silencers 21 and 23, in the vicinity of their ends, to a rigid part of the vehicle body 2, namely to the vehicle floor 4.

The inlet and collecting apparatus 13 has an exhaust manifold which has, for each exhaust gas outlet of the engine, an inlet pipe connected to one of the exhaust gas outlets of the engine casing. The apparatus 13 furthermore has collective connecting means connecting the outlets of the inlet pipes to one another and an outlet common to all inlet pipes. The inlet and collecting apparatus 13 is, for example, formed completely rigidly or at least in a manner such that the common outlet is rigidly connected to the engine casing 6a. The catalytic converter 14 has a rigid casing with an inlet which is rigidly connected to the common outlet of the inlet and collecting apparatus 13. The pipes 17, 22, 24 and any pipes present in the connections 15, 19 are rigid The inlet and collecting apparatus 13, the casing of the catalytic converter 14, the pipes 17, 22, 24 and the connections 15, 19 consist of metallic material, for example stainless steel. The successive parts 13 to 24 of the exhaust are tightly connected to one another.

The two elastically deformable pipe members 16, 18 are shown only schematically in FIG. 1 and have, for example, a metallic, flexible, bendable bellows, namely of stainless steel, which can be lengthened and shortened and whose ends are tightly connected, for example indirectly or directly welded, to the preceding and subsequent exhaust parts in each case. The pipe members 16, 18 can, for example, also have a shell enclosing the bellows in cross-section at a distance away, in order to protect the bellows from external damage and to limit the deformations of the bellows.

Figure 2:
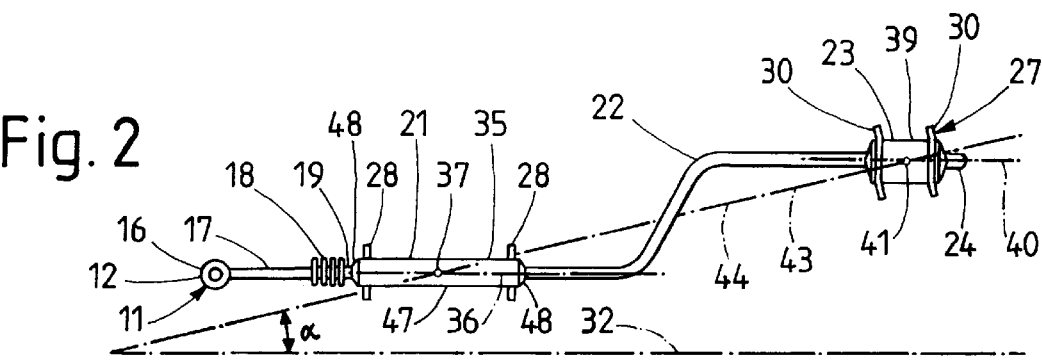
FIG. 2 shows a plan view of that part of the exhaust of the exhaust system which is located downstream of the catalytic converter.

FIG. 2 shows a straight line 32 parallel to the longitudinal direction of the vehicle and the principal driving direction of the motor vehicle 1. In the undeformed rest state, the bellows of the two elastically deformable pipe members 16, 18 are approximately straight and define axes making an angle with one another. The first deformable pipe member 16 runs, for example, from the catalytic converter 14 approximately perpendicularly downward or downward at an inclination. The second deformable pipe member 18 is, for example, arranged approximately in the longitudinal direction of the vehicle and thus has an axis approximately parallel to the straight line 32. The two elastically deformable pipe members 16, 18 serve as vibration dampers and decoupling member and are intended to decouple, with respect to vibration, those parts of the exhaust 12 which are located downstream of the pipe members 16, based on the direction of flow of the exhaust gas, from the engine and as substantially as possible to prevent vibrations or oscillations of the engine casing, generated during operation of the engine, from being transmitted to exhaust parts located downstream of the pipe members 16, 18. The two pipe members 16, 18 are also intended for decoupling from the engine casing the exhaust parts which are located downstream of said members, with respect to other movements, i.e. those not caused by oscillations, in particular with respect to tilting movements. By elastic deformations—in particular bending movements and possibly reductions and/or increases in the length of their bellows—the two pipe members 16, 18 can compensate changes, caused by temperature changes, in the length of the rigid exhaust parts present between the engine casing 6a and the first silencer 21, i.e. in particular of the exhaust manifold of the inlet and collecting apparatus 13, of the casing of the catalytic converter 14, of the pipe 17 and of the connection 19. The two pipe members 16, 18 together can, for example, compensate length and other dimensional changes which are parallel to the longitudinal direction of the vehicle and are up to at least 5 mm or up to at least 10 mm or even up to approximately or more than 20 mm.

The first silencer 21 has a first, elongated casing 35. This has an inlet and an outlet, is essentially rotationally symmetrical with respect to a first casing axis 36 and at least approximately defines a first casing center 37. The second silencer 23 has a second, elongated casing 39. This has an inlet and an outlet and is essentially rotationally symmetrical with respect to a second casing axis 40, but the inlet and the outlet are, for example, staggered relative to the axis 40. The second casing 39 at least approximately defines a second casing center 41. The two casing axes 36, 40 are, for example, approximately parallel to the driving plane 9 and to the longitudinal direction of the vehicle. However, the two casing axes are staggered relative to one another, for example in the plan view shown in FIG. 2. Furthermore, the two casing axes may also have heights, i.e. distances from the driving plane 9, which differ slightly from one another. The two casings 35, 39 define a straight connecting line 43 passing through said casings. Said line passes, for example at least approximately, through the two casing centers 37, 41 but may instead pass through the outlet of the first casing and the inlet of the second casing. The straight connecting line between the casings is approximately parallel to the driving plane 9 or makes at most a small angle with said plane and, for example, makes an angle α with the longitudinal direction of the vehicle. The vertical plane perpendicular to the driving plane 9 and passing through the straight connecting line 43 between the casings is designated below as casing connecting plane 44.

Figure 3:
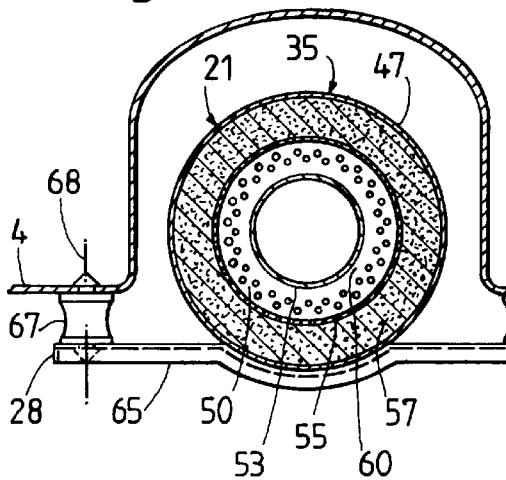
FIG. 3 shows a cross-section through the first silencer of the exhaust system on a larger scale.

The first casing 35 of the first silencer 21 also shown in FIG. 3 has a tight wall with an essentially cylindrical shell 47 and two end walls 48 facing away from one another and connected tightly and firmly to the shell. The casing 35 contains two gas-permeable intermediate walls 50, each of which is located in the vicinity of one of the end walls 48 and consists of an essentially flat, annular disk perforated at least in places. The silencer 21 has two pipes 53 coaxial with the axis 36, each of which passes through one of the end walls 48 and the intermediate wall 50 located closer to this. The two pipes 53 are rigidly and tightly connected to the end wall 48 through which they pass. The intermediate walls 50 are tightly connected to the shell 47 and/or to the pipe 53 passing through it and have flanges fastened to the shell, for example by spot welds. The outer ends of the pipes 53 form the inlet and outlet of the silencer 21. Each pipe 53 has, in the vicinity of its inner end, a gas-permeable, perforated section. The inner ends of the two pipes 53 are open or closed and are separated from one another by an intermediate space in the axial direction. The casing 35 contains a generally cylindrical inner shell 55 between the two end walls 50. Said inner shell consists of two sleeve-like inner shell parts, each of which is fastened at one end to one of the intermediate walls 50. The other end sections of the two inner shell parts, which sections face away from the intermediate walls, enclose one another with at most little play and are displaceable relative to one another and parallel to the axis 36. The two-part inner shell 55 is gas-permeable and perforated over the greater part of its length. The casing 35, the intermediate walls 50, the two pipes 53 and the inner shell 55 consist of metallic materials, for example stainless steel. Present between the shell 47 and the inner shell 55 is an intermediate space which is annular in cross-section and is filled with a layer of heat-insulating and sound-absorbing material 57. Present between each end wall 48 and the intermediate wall 50 adjacent to it is likewise an intermediate space which encloses the pipe passing through the two walls and is filled with heat-insulating and sound-absorbing material 57. The material 57 consists of mineral fibers, for example of basalt wool and/or other rockwool and/or glass wool. On the other hand, the inner space 60 enclosed by the inner shell 55 in cross-section and present between the two intermediate walls 50 is hollow and empty—apart from the pipes 53 and any supports present and serving for supporting said pipes.

Figure 4:
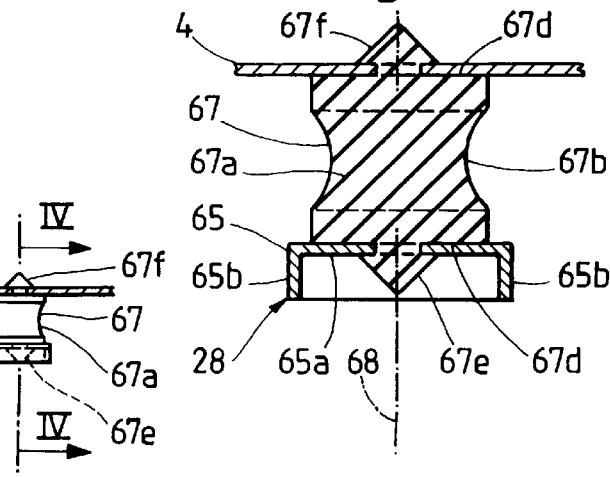
FIG. 4 shows a section through a holder serving for holding the first silencer, along the line IV—IV of FIG. 3, on an even larger scale.

The two holders 28 serving for fastening the first silencer 21 are, for example, formed identically or similarly, are a distance apart along the silencer and are fastened in the vicinity of the two ends of the silencer 21, namely at its intermediate walls 50 to its shell. The holder 28 is formed, for example, according to FIGS. 3 and 4, which also show a section of the vehicle floor 4. This is, for example, in general more or less flat but has an upward-projecting bulge. This bounds a channel which is open downward, is frequently referred to as a tunnel and may contain a shaft not shown and in which at least a part of the exhaust 12, but in particular at least a cross-sectional region of the first silencer 21, is located.

Each holder 28 has a retaining member 65 directly engaging the casing 35 of the first silencer 21, and two connecting members 67 connecting said retaining member to the vehicle floor 4. The retaining member 65 consists of a metallic material, for example stainless steel. The retaining member 65 is rigid, elongated and arranged at right angles to the silencer 21 and consists essentially of a U-profile bar with a web 65a and two limbs 65b. The U-profile bar is reinforced at the ends by end members which are connected to the limbs and the web. The middle section of the retaining member 65 is bent parallel to the cross-sectional shape of the shell 47 of the silencer casing 35, rests with the outer, top surface of the web 65a on the lower side of the silencer casing 35, on the shell 47, and is fastened to the shell 47, for example, by a few spot welds or other weld connections. Each connecting member 67 is at least partly elastically deformable and consists, for example, of a one-piece, rubber-elastic body of synthetic and/or natural rubber. Each connecting member 67 is essentially rotationally symmetrical with respect to an axis 68 approximately at right angles to the plane 9 and therefore approximately vertical and has a main section 67a. This consists of a compact block, has a solid cross-section over its entire axial dimension and thus contains no free cavities or intermediate spaces or holes. The main section 67a has a circumferential surface 67b which is generally cylindrical but slightly concave in the middle region in axial section, has flat, annular support and/or end surfaces 67d at its two ends and is associated in the middle region of each end with an approximately mushroom-shaped extension which extends away from said end in the axial direction and forms fastening and/or connecting means 67e and 67f. The two connecting members 67 belonging to the same holder 28 are staggered relative to one another along the retaining member 65 of the relevant holder and arranged close to the ends of the retaining member. Each connecting member rests with the flat support and/or end surfaces of its main section 67a on the upper surface of the web 65a of the retaining member or on a section of the lower surface of the vehicle floor 4.

The axial dimension or height of the main section 67a of the connecting member 67, measured between the two support and/or end surfaces, is, for example, about 50% to 150% of the maximum diameter of the main section. In an exhaust system for a car, the maximum dimension is furthermore preferably about 15 mm to 50 mm. The said axial dimension may then be about 10 mm to 50 mm.

Figure 5:
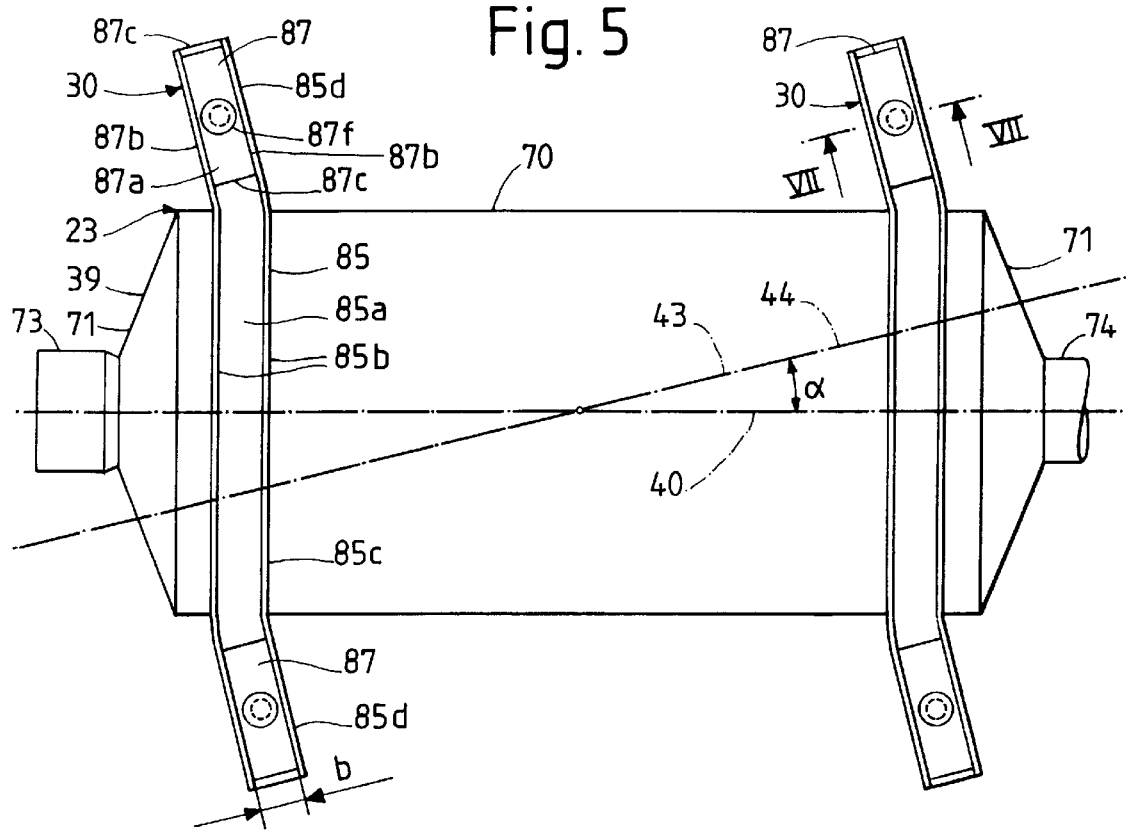
FIG. 5 shows a section of FIG. 2, containing the two silencers, on a larger scale.
Figure 6:
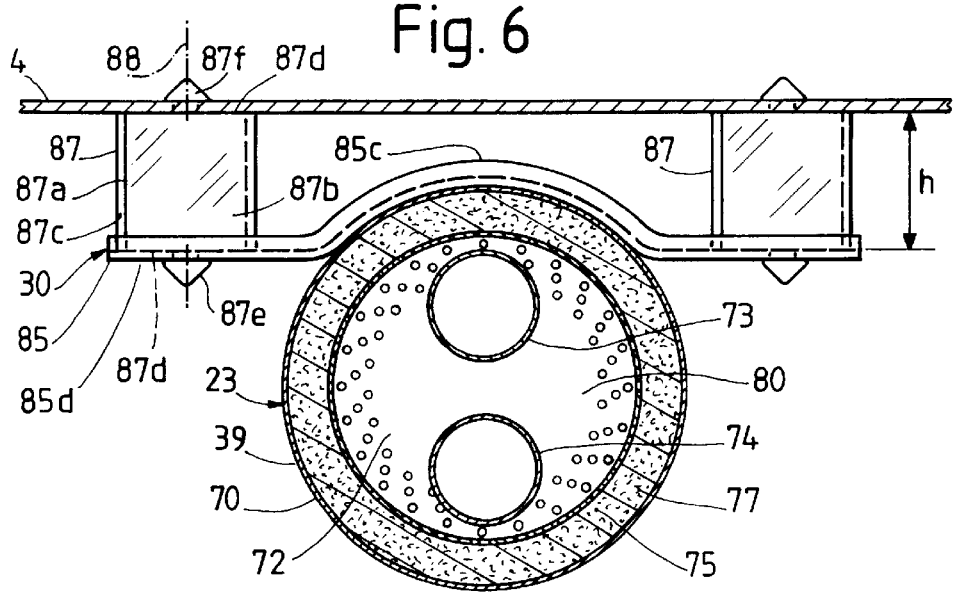
FIG. 6 shows a cross-section through the second silencer.

The second casing 39 of the second silencer 23 shown particularly clearly in FIGS. 5 and 6 has a cylindrical shell 70 and two end walls 71. The casing 39 contains two disk-like, perforated intermediate walls 72 which are gas-permeable at least in places. The silencer 23 has two pipes 73 and 74, each of which passes through one of the end walls 71 and intermediate wall 72 adjacent thereto. The casing 39 of the second silencer 23 is shorter than the casing 35 of the first silencer 21 but has a larger diameter than the casing 35. The pipes 73, 74 are parallel to the axis 40 but staggered relative to said axis and arranged, for example, above or below said axis. Furthermore, the two pipes 73, 74 have sections located side by side in the same longitudinal region of the second casing 39. The outer end of the pipe 73 forms the inlet of the second silencer 23 and is connected to the pipe 22. The pipe 73 is compressed, for example, at its end located in the casing 35 and more or less tightly closed and has a gas-permeable, perforated section 73 close to this end but could also be open at the inner end. The pipe 74 is, for example, open at its inner end. The outer end of the pipe 74 forms the outlet of the second silencer 23 and is connected to the pipe 24 and/or forms said pipe. The second silencer 23 has an inner shell 75 which, as in the case of the first silencer, consists of two inner shell parts which project one into the other and are displaceable relative to one another, and for the most part is gas-permeable and perforated. The two intermediate spaces present between the end walls 71 and one of the gas-permeable intermediate walls 72 and the intermediate space present between the shell 70 and the inner shell 75 contain a heat-insulating and sound-absorbing material 77. This consists of mineral fibers, as in the case of the first silencer. The inner space 80 present between the two intermediate walls 72 and enclosed by the inner shell 75 in cross-section is hollow and free, apart from the pipes 73, 74. Unless stated otherwise, the second silencer 23 is formed similarly to the first silencer 21.

The second silencer 23 is arranged, for example, in the vicinity of the rear end of the motor vehicle 1, behind its rear axle, under a more or less flat section of the vehicle floor 4. The two holders 30 serving for holding the second silencer casing 39 are formed, for example, identically and are also shown in FIG. 5. Furthermore, one of these holders 30 is shown in FIGS. 6 and 7. Each holder 30 has a rigid, elongated, metallic retaining member 85, for example consisting of stainless steel. Each retaining member 85 is formed, similarly to the retaining member 65, from a U-profile bar and has a web 85a and two limbs 85b. The U-profile bar is reinforced at the ends by end members which are connected to the limbs and the web. Each retaining member 85 has a middle section 85c and two end sections 85d. In the plan view shown in FIG. 5, i.e. in a projection at right angles to the plane 9, the middle section 85c is straight and is at right angles to the second casing axis 40. In the direction of view shown in FIG. 6 and parallel to the axis 40, the middle section 85c is at least partly bent in such a way that it rests with the lower surface of the web 85a on the upper side of the second casing 39, on the shell 70 thereof. The middle section 85c of the retaining member 85 of each holder 30 is fastened to the shell 70 by a few spot welds. The end sections 85d are at least essentially straight and are angled or bent relative to the middle section 85c in such a way that they are at least approximately at right angles to the casing connecting plane 44. The end sections 85d are accordingly at least approximately parallel to the horizontal plane 9 and furthermore, according to FIG. 6, parallel to those sections of the vehicle floor 4 which are opposite them.

Each holder 30 has two at least partially elastically deformable, namely rubber-elastic connecting members 87, each of which is arranged at one of the end sections 85d of the retaining member 85 and one of which is shown separately in FIG. 8. Each connecting member 87 consists of a one-piece body of synthetic and/or natural rubber and defines an axis 88 at least approximately perpendicular to the driving plane 9. Each connecting member 87 has a main section 87a. This consists of a cuboid, compact block, has a solid cross-section over its entire axial dimension and thus contains no cavities or intermediate spaces or holes. In a cross-section at right angles to the axis 88, the main section 87a is rectangular and has two broad lateral surfaces 87b, two narrow lateral surfaces 87c and two support and/or end surfaces 87d. The lateral surfaces 87b, 87c are flat and parallel to the axis 88. The support and/or end surfaces 87d are flat and at right angles to the axis 88. The main section 87a is associated in the middle region of each end with an approximately mushroom-shaped extension which projects away from said end in the axial direction and forms fastening and/or connecting means 87e and 87f. In a cross-section at right angles to the axis 88, the main section 87a has a cross-sectional dimension—i.e. width—a measured parallel to the broad lateral surfaces 87b and a cross-sectional dimension—i.e. thickness—b measured at right angles to said width and parallel to the narrow lateral surfaces 87c. The main section 87a furthermore has an axial dimension or height h measured parallel to the axis 88 The width a and the height h are at least twice and, for example, at least approximately three times to approximately five times the thickness b. The thickness b is, for example, about 7 mm to 15 mm. The width a and the height h may then be, for example, about 20 mm to 75 mm. That end of the main section 87a of each connecting member 87 which is located at the bottom in FIGS. 1 and 6 projects from above into the groove of an end section 85d of a retaining member 85, is guided by the limbs 85b with at most little play and rests with its flat support and/or end surface 87d on the web 87a. The broad lateral surfaces 87b of each connecting member 87 are parallel to the longitudinal direction of the relevant end section 85d of the retaining member 85.

During mounting of the exhaust, the mushroom-shaped fastening and/or connecting means 67e, 67f, 87e, 87f are inserted through holes in the webs 65a and 87a and in the vehicle floor 4 with a temporary elastic deformation and snap in so that the heads of the fastening and/or connecting means grip behind the webs 65a, 87a and the vehicle floor 4. The connecting members 67, 87 then detachably connect the retaining members 65 and 85 and the two silencers 21 and 23, respectively, welded to said members, to the vehicle floor 4.

In the mounted state, each silencer 21 and 23 is thus held on the vehicle floor 4 of the vehicle body 2 by four connecting members 67 and 87. The four connecting members 67 and 87 together form a four-point suspension. The midpoints of the four connecting members 67 and 87 holding the same silencer define a quadrilateral, for example a rectangle, in a vertical projection onto the driving plane 9. Two connecting members are present on each side of a plane perpendicular to the driving plane 9 and passing through the casing axis 36 or 46.

If the second silencer 23 is mounted on the vehicle body, the broad lateral surfaces 87b of the connecting members 87 are at least approximately at right angles to the casing connecting plane 44. Since the straight connecting line 43 between the casings is approximately parallel to the driving plane 9 and thus approximately horizontal, the broad lateral surfaces 87b are also approximately at right angles to the straight connecting line 43 between the casings. The main section 87a of each connecting member 87 thus has, at right angles to the straight connecting line 43 between the casings, a cross-sectional dimension or width a which is substantially greater than the cross-sectional dimension or thickness b measured at right angles to said width and parallel to the casing connecting plane 44.

The catalytic converter 14 is rigidly connected to the engine casing 6a by the inlet and collecting apparatus 13. Owing to their elastic deformability, the rubber-elastic connecting members 67, 87 of the holders 28, 30 permit deflections of the silencer casings 35 and 39 out of the rest positions of these casings. However, even with very small deflections in any direction, the connecting members generate restoring forces which oppose said deflection and, with growing deflection, increase steadily within a certain range, monotonically and, for example, more or less linearly with respect to the deflection. The connecting members furthermore provide vibration-damping connections between the silencer casings and the vehicle body.

The connecting members 67 connecting the first casing 35 to the vehicle floor 4 thus permit certain movements of the first casing 35, which however are only relatively small in all directions. The connecting members 67 of the holders 28 are preferably formed in such a way that, when the exhaust is assembled and preferably also in the state separated from the remaining exhaust, the first casing 35 is deflected at most 5 mm and preferably at most 2 mm from the middle and/or rest position by a constant, steady-state acceleration of 10 m/s$^2$ and, for example, also 20 m/s$^2$ or even 50 m/s$^2$ acting on the casing or a constant, steady-state force of 100 N in any direction relative to the vehicle body.

If the second casing 39 is held on the vehicle body 2 but is separate from the remaining exhaust, the rubber-elastic connecting members 87 are bent to substantially greater extent by a force which acts on the second casing and is parallel to the straight connecting line 43 between the casings and hence also approximately parallel to the line of intersection of the driving plane 9 with the housing connecting plane 44 than by a force of equal magnitude which acts on the second casing and is at right angles to the casing connecting plane 44. If a force at right angles to the driving plane 9 and thus approximately parallel to the axes 88 acts on the second casing 39, this force compresses or extends the connecting members 87 and causes a deflection or displacement of the second casing parallel to the axes 88. If the second casing is separate from the remaining exhaust, however, a force parallel to the axes 88 causes substantially smaller displacement of the second casing than a force of equal magnitude parallel to the straight connecting line 43 between the casings. In the state separated from the remaining exhaust, the second casing 39 is thus deflected from the rest position by a force acting on it and parallel to the straight connecting lines 43 between the casings to a substantially great extent than by a force of equal magnitude which is at right angles to the straight connecting line 43 between the casings and/or to the line of intersection of the casing connecting plane 44 with the driving plane 9 and otherwise has any desired direction. The rubber-elastic connecting members 87 are preferably formed in such a way that, when the exhaust is assembled and preferably also in the state separated from the remaining exhaust, the second casing 39 is deflected from the middle and/or rest position at most 5 mm and preferably at most 2 mm by a constant, steady-state acceleration of 10 m/$^2$ and, for example, also 20 m/s$^2$ or even 50 m/s$^2$ acting on the casing and at right angles to the straight connecting lines between the casings and otherwise having any direction, or a constant, steady-state force of 100 N, relative to the vehicle body. At least in the state connected to the remaining exhaust and possibly also in the state separated from the remaining exhaust, the second casing 39 is preferably deflected from the middle and/or rest position at most 5 mm and, for example, even only at most 2 mm by an acceleration or force parallel to the straight connecting line 43 between the casings and having the above-mentioned magnitudes, relative to the vehicle body. The connecting members 87 are, however, formed in such a way that the second casing 39 can be displaced at least about 5 mm and, for example, even at least about 10 mm by the relatively large forces generated by thermal expansions of the pipe 22, with an elastic deformation—in particular a bending movement—approximately along the straight connecting line 43 between the casings and/or approximately parallel to the line of intersection of the casing connecting plane 44 with the driving plane 9.

As already mentioned in the introduction, the exhaust is heated by the exhaust gas fed to it by the internal combustion engine. The thermally caused changes in the length of the rigid exhaust parts arranged upstream of the first silencer 21 are at least for the most part compensated by the two elastically deformable pipe members 16 and 18. The bellows of the pipe members 16, 18, which bellows have approximately straight axes in the rest state, are then bent and possibly also slightly compressed during operation of the engine.

The exhaust part connecting the outlet of the first casing 35 to the inlet of the second casing 39 is at least essentially formed by the bent pipe 22, contains neither bellows nor other deformable pipe members and is therefore essentially rigid everywhere. The pipe 22 forms a relatively long part of the exhaust. The distance of the inlet of the second silencer from the outlet of the first silencer, measured along a straight line, is usually at least about 80 cm and generally at least about 1 m to about 2 m. The exhaust gas is cooled along its flow path in the exhaust and heats the pipe 22 to a temperature of, for example, 200° C. to 400° C. Owing to this heating, the pipe 22 is lengthened, for example, by about 0.25% to about 0.5%, so that said distance of the inlet of the second silencer from the outlet of the first silencer during operation of the engine is increased, for example, by about 2 mm to 10 mm. This change of length of the pipe 22 and the relatively large force generated by the latter and forcing the two silencer casings apart causes bending of the rubber-elastic connecting members, in particular of the connecting members 87 present in the second casing 39. The lengthening of the pipe 22 is therefore compensated at least for the most part by an elastic bending of the connecting members 87 and a displacement or deflection of the second casing.

The pipes present in the silencers are also heated by the exhaust gas and also lengthened. Since these pipes are fastened only at one end to the casing of the relevant silencer and are free at the other end, they can increase in length unhindered without generating stresses. The exhaust gas also heats the inner shells 55 and 75 of the silencers. Since each inner shell consists of two parts whose one end is fastened and whose other end is displaceable, the changes in length of the inner shell parts, too, do not cause any stresses. The materials 57, 77 present in the casings of the silencers and consisting of fibers insulate the shells 47, 70 thermally from the exhaust gas so that these shells are heated by the exhaust gas at most relatively slightly to temperatures of, for example, about 100° C. to 300° C. Accordingly, the hot exhaust gas also causes at most small increases in the length of the shells 47, 70. These increases in length can be compensated by elastic deformations, in particular bending movements, of the rubber-elastic connecting members 67, 87. Besides, the heat-insulating materials 57, 77 prevent the connecting members 67, 87 consisting of rubber from being damaged by excessive heating.

As already described in the introduction, oscillations of the various exhaust parts may be generated by the vibrations of the engine casing and the pulsating exhaust gas during the use of the motor vehicle. Furthermore, movements of the engine casing which are caused by rapid changes in the power output by the engine may be transmitted from said engine casing to exhaust parts. In addition, driving may cause accelerations which act on the exhaust parts. The silencers have the greatest mass per unit length from the exhaust parts arranged downstream of the first elastically deformable pipe member 16. The connecting members 67, 87 connect the two silencers in a slightly mobile and springy manner to the vehicle floor. As described, however, the connecting members 67 permit only small deflections of the first silencer in all directions. The connecting members 87 keep deflections of the second silencer, in particular in all directions at right angles to the straight connecting line 43 between casings very small and also inhibit displacements parallel to the connecting line 43. Furthermore, the angle α is usually relatively small, for example at most 30°. The straight connecting line between casings is in practice frequently even approximately parallel to the longitudinal direction of the vehicle, so that the angle α is approximately equal to zero.

In the case of relatively freely mobile exhausts, as disclosed in the prior art, the various exhaust parts and in particular the relatively heavy silencers tend in particular to execute oscillations which are approximately transverse with respect to the general longitudinal direction of the exhaust. Driving over irregularities causes accelerations which act on the silencers and other exhaust parts and are predominantly in a vertical direction. Driving around curves causes in particular accelerations which are approximately horizontal and approximately at right angles to the longitudinal direction of the vehicle. Although the connecting members 67, 87 are deformable, they prevent strong resonant oscillations and oscillations of large amplitudes. They also prevent accelerations caused by normal driving from producing large movements of the silencers and of the other rigid exhaust parts arranged downstream of the first deformable pipe member 16. The pipes 22, 24 and in particular the two silencers 21, 23 are deflected by the vibrations generated during normal operation of the internal combustion engine and any oscillations generated by the pulsating exhaust gas at most 5 mm, preferably at most 2 mm and usually at most 1 mm or even only at most 0.5 mm in all directions from their middle positions which they assume as a result of the thermal changes in dimensions after reaching the operating temperature. The movements transmitted during normal driving of the motor vehicle as a result of changes in the instantaneous engine power from the engine casing to the exhaust and the accelerations caused by uneven ground, curves and acceleration and braking processes and acting on the exhaust can also cause deflections from said middle positions. These deflections are likewise at most 2 mm and usually at most 0.5 mm in all directions.

The pipes arranged downstream of the catalytic converter 14 and in particular of the first elastically deformable pipe member 16 need not absorb any large accelerations and forces caused by the vibrations and/or the changes in engine power and/or the driving. The pipes 17, 22 and 24 therefore need essentially only bear their own weight and possibly also partly the weight of the elastically deformable pipe members 16, 18. It is therefore not necessary to hold the pipes 22, 24 on the vehicle body by holders directly engaging said pipes themselves. The pipes 17, 22, 24 and the pipes 53, 73, 74 present in the silencers can moreover be made relatively thin-walled and have wall thicknesses which are at least essentially at most 1 mm, preferably at most 0.8 mm and, for example, about 0.5 mm. The walls of the pipes of the exhaust manifold of the inlet and collecting apparatus 13 may also be slightly thinner than in the case of conventional exhaust systems not according to the invention and may have thicknesses similar to the pipes arranged after the catalytic converter 14. The shells 47, 70, end walls 48, 71, intermediate walls 50, 80 and inner shells 55, 75 of the two silencers likewise need only have small wall thicknesses. These wall thicknesses are, at least in the case of the largest parts of these shells and walls, at most 1 mm, preferably at most 0.8 mm and, for example, about 0.5 mm.

The motor vehicle 101 shown in FIG. 9 once again consists of a car, has a vehicle body 102 with bodywork 103, a vehicle floor 104 and a chassis 105 and an internal combustion engine 106 with an engine casing 106a and stands on a driving plane 109. The vehicle furthermore has an exhaust system 111 shown separately in FIG. 10 and having an exhaust 112. This has, in succession along the exhaust gas flow path, beginning at the engine, an inlet and collecting apparatus 113 with an exhaust manifold and a common outlet, a first elastically deformable pipe member 116, a rigid pipe 117, a second elastically deformable pipe member 118, a connection 119, a catalytic converter 120, an connection 121, a silencer 122, a pipe 123, a second silencer 124 and a pipe 125 forming the outlet of the exhaust. The exhaust 112 has three casings arranged downstream of the deformable pipe members 116, 118 and below the vehicle floor 104, namely a first casing 131 belonging to the catalytic converter 120, a second casing 132 belonging to the silencer 122 and a third casing 133 belonging to the silencer 124. The casing 131 of the catalytic converter 120 may have wall thicknesses similar to those stated above for the silencer casings and, like these, may contain heat-insulating fiber materials. Each casing 131, 132, 133 defines at least approximately a first casing center 135 or a second casing center 136 or a third casing center 137. FIG. 10 also shows a straight line 141 parallel to the longitudinal direction of the vehicle, a straight connecting line 142 between casings and a straight connecting line 143 between casings. The straight connecting line 142 between casings passes through the first casing 131 and the second casing 132, namely approximately through the casing centers 135, 136. The straight connecting line 143 between casings passes through the first casing 131 and the third casing 133, for example approximately through the first casing center 135 and the third casing center 137. The connection 121 connecting the first casing to the second casing is, for example, very short and straight so that the inlet of the second casing 132 is located only a short distance away from the outlet of the first casing 131. On the other hand, the pipe 123 connecting the two silencers, i.e. the second and third casings, to one another is relatively long. The axes of the three casings are, for example, approximately parallel to the longitudinal direction of the vehicle. The axis of the second casing coincides, for example, approximately with that of the first casing, while the axis of the third casing is, for example, offset from that of the first casing so that the straight connecting line 143 between casings once again makes an angle α with the longitudinal direction of the vehicle.

The exhaust system 111 also has retaining means 151 which hold the three casings 131, 132, 133 on the vehicle floor 104. The retaining means have two holders 153 for holding the first catalytic converter casing 131 and two holders 155 for holding the second casing 132 and two holders 157 for holding the third casing 133. The holders 153 serving for holding the first casing 131 are formed identically or similarly to the holder 28 and, like these, have connecting members rotationally symmetrical with respect to an axis. Since the second casing 132 is located close to the first casing 131, the rubber-elastic connecting members of the holders 155 serving for holding the second casing need compensate only relatively small length changes caused by thermal expansion. The holders 155 can therefore likewise be formed similarly to the holders 28 and, like these, can have connecting members rotationally symmetrical with respect to an axis. However, the holders 155 fastened to the second casing 132 can instead have connecting members which, similarly to the connecting members 81, have cuboid main sections. The broader lateral surfaces of the latter can then be approximately perpendicular to a casing connecting plane which is perpendicular to the driving plane 109 and passes through the straight connecting line 142 between casings. The holders 157 of the third casing 133 are formed identically or similarly to the holders 30 and, like these, have rubber-elastic connecting members with cuboid main sections. The broader lateral surfaces of the latter should then be approximately perpendicular to the casing connecting plane which is perpendicular to the driving plane 109 and passes through the straight connecting line 143 between casings. Unless stated otherwise above, the exhaust system 111 may be formed similarly to the exhaust system 11 and may have characteristics similar to this.

The connecting member 201 shown in FIGS. 11 and 12 has a cuboid main section 201a with two broad lateral surfaces 201b, two narrow lateral surfaces 201c and two support and/or end surfaces 201d. The connecting member 201 defines an axis 202 and consists of a composite body having a rubber body 203 which forms the largest part of the main section 201a and comprises natural and/or synthetic rubber. The rubber body forms the four lateral surfaces 201b, 201c and has a recess 203a at its ends. Each recess 203a contains a flat lamella 204. The lamellae 204 and the edges of the rubber body 203 which enclose them together form the flat support and/or end surfaces 201d of the connecting member 201. Each recess 203a furthermore contains the head of a bolt which is coaxial with the axis 202, passes through a hole in the lamella, has a thread part projecting away from the main section 201a and forms a fastening and/or connecting means 205. The two lamellae 204 and the fastening and/or connecting means 205 consist of a metallic material, for example steel, and are connected firmly and nondetachably to the rubber body by integral casting and/or integral vulcanization of the rubber and/or by adhesive bonding or the like. The rubber body forms a compact block and has a solid cross-section between the recesses filled by the lamellae 204 and fastening and/or connecting means 205.

The connecting member 211 shown in FIGS. 13 and 14 consists, like the connecting member 201, of a composite body having a rubber body, two lamellae and fastening and/or connecting means 215, 216. One set of fastening and/or connecting means 215 are bolt-like, as in the case of the connecting member 201. The other fastening and/or connecting means 216 are formed by a threaded bush or nut which projects from the rubber body into the hole in the lamella and whose threaded bore is closed by a disk at that end of the fastening member which is located deeper in the rubber body.

The connecting member 221 shown in FIGS. 15, 16 consists, like the connecting members 87, of a one-piece rubber body and has a block-shaped main section 221a with two broad lateral surfaces 221b, two narrow lateral surfaces 221c and two support and/or end surfaces 221d. However, the connecting member 221 differs from the connecting members 87 in that the broad lateral surfaces 221c are at least partly indented and curved in a concave manner in an axial section. The main section therefore has at mid height a thickness $b_{min}$ which is smaller than the thickness $b_{max}$ at the support and/or end surfaces 221d. The ratio of the width a to the thickness in the middle between the two support and/or end surfaces 221d is then equal to $a/b_{min}$ and may be, for example, up to about 10. The ratio of the height h to the minimum thickness $b_{min}$ may then be approximately in the range from 2 to 10.

The connecting members 87 of the exhaust system 11 and the corresponding connecting members of the exhaust system 111 may be completely or at least partially replaced by connecting members 201 or 211 or 221. The or each connecting member 211 may then be connected, for example, by the connecting means 215 to a retaining member and by the fastening means 216 to the vehicle floor, or vice versa. Accordingly, the vehicle floor 4 may then be provided with welded-on threaded bushes or threaded bolts or the like. Furthermore, the features of the connecting members 87, 201, 211, 221 can be combined with one another and it is possible to provide, for example, connecting members which have a mushroom-shaped rubber extension at one end and a bolt or threaded bush at the other end or threaded bushes at both ends. Furthermore, it is possible to provide connecting members which have, at least at one end, a threaded part formed in the same way as in a self-tapping screw or are formed for riveting on or welding on. The narrow lateral surfaces of the main sections of the at least partially rubber-elastic, non-rotationally symmetrical connecting members 87, 201, 211, 221 may be convex in axial sections and/or in sections at right angles to the axes, so that their middle regions project outward. The rotationally symmetrical connecting members 67 may likewise be replaced by composite bodies which, analogously to the connecting members according to FIGS. 11 to 14, have metallic lamellae and metallic fastening and/or connecting means. In addition, the rubber bodies of the generally rotationally symmetrical connecting members 67 may be completely cylindrical or may have, at least at one end, a polygonal end section for engaging a wrench or essentially completely the shape of a regular polygon, for example a hexagon or octagon, in cross-section.

The apparatus 251 shown in FIG. 17 forms a combined catalytic converter/silencer and has an elongated casing 255. The casing 255 contains, for example similarly to the silencer casings of the exhaust 12, two gas-permeable intermediate walls, a gas-permeable inner shell and heat-insulating and sound-absorbing fiber materials. The casing, intermediate walls and the inner shell may be formed similarly to, and have wall thicknesses similar to, the silencers of the exhaust 12.

The intermediate walls and the inner shell bound a hollow interior 270. The casing 255 is provided at two end walls with an inlet 271 and an outlet 272 and contains catalyst means 275. These subdivide the interior 270 into a first, inner interior region 277 and a second, outer interior region 278. The inlet 271 opens into the first interior region 277. The outlet 272 is formed by the silencer pipe which projects into the second interior region 278. The catalyst means 275 serves for the catalytic purification of the exhaust gas and has a plurality of passages which connect the first interior region to the second one. The catalyst means 275 may have, for example, two catalyst members arranged in a V-shape and may be formed similarly to that disclosed in U.S. Pat. No. 5,593,645 incorporated herein by reference thereto.

The apparatus 251 serving both for catalytic exhaust gas purification and for silencing can be installed, for example instead of the first silencer 21, in the exhaust 12 shown in FIG. 1. The catalytic converter 14 of the exhaust 12 then serves only as a preliminary and/or starting catalytic converter and can have relatively small dimensions. The apparatus 251 may also replace the catalytic converter 120 and the first silencer 122 of the exhaust 112 shown in FIGS. 9 or 10. The casing 255 of the apparatus 251, i.e. the combined catalytic converter/silencer, forms in both stated cases the first casing arranged downstream of the deformable pipe members 16, 18 or 116, 118 and can be held on the vehicle floor by means of holders 291 whose connecting members, analogously to the connecting members 67, are essentially rotationally symmetrical with respect to an axis.

The motor vehicle and its exhaust system may also be modified in various ways.

In particular, it is also possible to combine features of different embodiments with one another. For example, in the exhaust 112 shown in FIGS. 9 and 10, it is also possible to provide a preliminary and/or starting catalytic converter which, analogously to the catalytic converter 14 in FIG. 1, is connected rigidly to the inlet and collecting apparatus 113 and is arranged upstream of the first elastically deformable pipe member.

The axes of the exhaust parts arranged downstream of the deformable pipe members may furthermore all lie in the same vertical plane parallel to the longitudinal direction of the vehicle. Accordingly, the straight lines corresponding to the straight connecting lines 43, 142, 143 between casings then also lie in this vertical plane.

The shapes of the retaining members 65, 85 and the fastening thereof to the casing can also be modified. Furthermore, those ends of the connecting members which face away from the retaining members can be fastened not directly to the vehicle floor but, for example, to rod-like, metallic support members which in turn are fastened to the vehicle floor.

Moreover, instead of being perpendicular to the driving plane, the axes of the connecting members may be arranged inclined or parallel to said plane if this is expedient, for example owing to the shape of the vehicle floor. However, the non-rotationally symmetrical connecting members should then be arranged in such a way that the middle and/or symmetry plane passing through the axis of a connecting member and between its narrower lateral surfaces is approximately parallel to the straight connecting lines between casings, and in such a way that the axis of the connecting member is approximately at right angles to the straight connecting lines between casings, so that the connecting member is lighter and more readily deformable in a direction approximately parallel to the straight connecting lines between casings than in directions at right angles to the straight connecting lines between casings.

Furthermore, each casing may be connected to the vehicle body only by means of three at least partially rubber-elastic connecting members. The three connecting members should then not all lie on one and the same line and should preferably form a triangle in a right-angled projection onto the plane. Furthermore, at least one or each casing may be connected to the vehicle floor and/or chassis only by means of two connecting members. The first catalytic converter and/or silencer casing arranged downstream of the deformable pipe members may be fastened more or less rigidly on the vehicle body even without rubber-elastic connecting members at one connection point or a plurality of connection points.

If the motor vehicle consists of a truck or bus or the like, the casings may be fastened possibly at least partially on the chassis instead of on the vehicle floor of the motor vehicle.

In addition, only a single deformable pipe member may be provided instead of the two deformable pipe members 16, 18 or 116, 118.

Finally, reference is also made to the U.S. patent application Ser. No. 09/067,430 submitted simultaneously with this patent application for the same applicant and whose content is hereby incorporated into the present patent application, unless there are any contradictions.

What is claimed is:

1. An exhaust system for a motor vehicle having a vehicle body, an internal combustion engine, and an exhaust which can be connected to the internal combustion engine, the exhaust system comprising at least one deformable pipe member, and at least two casings arranged downstream of said deformable pipe member and having retaining means for holding the exhaust on the vehicle body, the first casing being arranged downstream of the deformable pipe member, and the last casing defining a straight line passing through the two casings, wherein the exhaust has an exhaust section which connects the first casing to the last casing and is essentially rigid along its entire length, wherein each of said casings comprises a shell having a wall thickness of at most 1 mm, wherein the exhaust section connecting the first casing to the last casing comprises at least one pipe having a wall thickness of at most 1 mm, wherein each casing has two opposite ends, wherein the retaining means have two holders for holding the exhaust in the vicinity of the opposite ends of the casings, and have elastically deformable connecting members, and wherein connecting members which are associated with the last casing are elastically deformable in such a manner that in a state separated from the remaining exhaust, the last casing is adapted to be deflected, relative to the vehicle body, a greater distance by a force acting on said last casing and parallel to said straight line than by a force of equal magnitude acting on said last casing and at a right angle to said straight line.

2. The exhaust system as claimed in claim 1, wherein the retaining means are formed in order to hold the first casing in such a way that, in one of the assembled exhaust and in the state separated from the remaining exhaust, said casing is adapted to be deflected at most 5 mm by one of a constant acceleration of 10 m/s$^2$ acting on the first casing and constant force of 100 N, in any direction relative to the vehicle body.

3. The exhaust system as claimed in claim 1, wherein the retaining means are formed in order to hold the first casing in such a way that, in the assembled exhaust in the state separated from the remaining exhaust, said casing is adapted to be deflected at most 2 mm by one of a constant acceleration of 10 m/s² acting on the first casing and constant force of 100 N, in any direction relative to the vehicle body.

4. The exhaust system as claimed in claim 1, wherein the retaining means are formed in order to hold the last casing in such a way that, in one of the assembled exhaust and in the state separated from the remaining exhaust, said casing is deflected at most 5 mm by one of a constant acceleration of 10 m/s² acting on the last casing and constant force of 100 N, in any direction at right angles to said straight line.

5. The exhaust system as claimed in claim 1, wherein the retaining means are formed in order to hold the last casing in such a way that, in one of the assembled exhaust and in the state separated from the remaining exhaust, said casing is deflected at most 2 mm by one of a constant acceleration of 10 m/s² acting on the last casing or constant force of 100 N, in any direction at right angles to said straight line.

6. The exhaust system as claimed in claim 1, wherein said straight line passes at least approximately through centers of the two casings.

7. The exhaust system as claimed in claim 1, wherein each connecting member serving for holding the last casing has a main section consisting at least partially of rubber-elastic material and connecting means which are arranged at opposite ends of said main section and of which one is connected to the last casing and the other is intended for connection to the vehicle body, and wherein the rubber-elastic part of the main section has in a cross-section passing between the two ends and at right angles to said straight line, a first cross-sectional dimension which is greater than a second cross-sectional dimension measured at a right angle to the first cross-sectional dimension.

8. The exhaust system as claimed in claim 7, wherein that part of the said main section which consists of rubber-elastic material has a solid, approximately rectangular cross-section between the connecting means.

9. The exhaust system as claimed in claim 1, wherein the exhaust has an intermediate casing which is arranged between the first casing and the last casing, and wherein the retaining means comprises elastically deformable connecting members associated with said intermediate casing and formed in such a way that, in at least one of the assembled exhaust and in the state separated from the remaining exhaust, said intermediate casing is adapted to be deflected at most 5 mm by a constant acceleration of 10 m/s² acting on said intermediate casing or a constant force of 100 N in a direction which is at a right angle to a straight line passing through said intermediate casing and the first casing, relative to the vehicle body.

10. The exhaust system as claimed in claim 1, wherein the exhaust has an intermediate casing which is arranged between the first casing and the last casing, and wherein the retaining means comprises elastically deformable connecting members associated with said intermediate casing and formed in such a way that, in at least one of the assembled exhaust and in the state separated from the remaining exhaust, said intermediate casing is adapted to be deflected at most 2 mm by a constant acceleration of 10 m/s² acting on said intermediate casing or a constant force of 100 N in a direction which is at a right angle to a straight line passing through said intermediate casing and the first casing, relative to the vehicle body.

11. The exhaust system as claimed in claim 1, wherein each casing defines an axis, and wherein two of the connecting members of each holder are spaced from each other and are located on opposite sides of the axis of the respective casing in a plan view.

12. The exhaust system as claimed in claim 1, wherein, the exhaust system comprises two deformable pipe members each comprising a bellows and connected with each other by a pipe.

13. A motor vehicle, comprising a vehicle body; an internal combustion engine; and an exhaust system having an exhaust thereof connected to the internal combustion engine, the exhaust system having at least one deformable pipe member, and at least two casings arranged downstream of said deformable pipe member and having retaining means for holding the exhaust on the vehicle body, the first casing being arranged downstream of the deformable pipe member, and the last casing defining a straight line passing through the two casings, wherein the exhaust has an exhaust section which connects the first casing to the last casing and is essentially rigid along its entire length, wherein each of said casings comprises a shell having a wall thickness of at most 1 mm, wherein the exhaust section connecting the first casing to the last casing comprises at least one pipe having a wall thickness of at most than 1 mm, wherein each casing has two opposite ends, wherein the retaining means has two holders for holding the exhaust in vicinity of the opposite ends of the casings and having elastically deformable connecting members, and wherein connecting members which are associated with the last casing are elastically deformable in such a manner that in a state separated from the remaining exhaust, the last casing is deflected, relative to the vehicle body, a greater distance by a force acting on said last casing and parallel to said straight line than by a force of equal magnitude acting on said last casing and at a right angle to the said straight line.

14. The motor vehicle as claimed in claim 13, wherein said motor vehicle is formed as a car, wherein its vehicle body has a vehicle floor and wherein the connecting means directly engage each casing and connect it to the vehicle floor.

15. An exhaust system for a motor vehicle having a vehicle body and an internal combustion engine and having an exhaust which can be connected to the internal combustion engine, the exhaust system comprising two deformable pipe members, at least two casings arranged downstream of said deformable pipe member, retaining means for holding the exhaust on the vehicle body, the first casing being arranged downstream of the deformable pipe members and the last casing defining a straight line passing through the two casings, wherein each of the two deformable pipe members comprises a bellows, wherein each of said casings comprises a shell having a wall thickness of at most 1 mm, wherein the exhaust section connecting the first casing to the last casing comprises at least one pipe having a wall thickness of at most 1 mm, wherein the two deformable pipe members are connected to one another by a pipe, the exhaust has an exhaust section which connects the first casing to the last casing and is essentially rigid along its entire length, wherein each casing has two opposite ends and defines an axis, wherein the retaining means have two holders for holding the exhaust in vicinity of the opposite ends of the casings, and wherein each holder comprises two elastically deformable connecting members spaced from one another and located on opposite sides of the axis of a respective casing in plan view, and wherein the connecting members which are coordinated with the last casing are elastically deformable in such a manner that, in a state separated from the remaining exhaust, the last casing is adapted to be deflected, relative to the vehicle body, a greater distance by a force acting on said last casing and parallel to said straight line than by a force of equal magnitude acting on said last casing and at a right angle to the straight line.

16. The exhaust system as claimed in claim 15, wherein the retaining means are formed in order to hold the first casing in such a way that, in the assembled exhaust and/or in the state separated from the remaining exhaust, said casing is adapted to be deflected at most 5 mm by a constant acceleration of 10 m/s$^2$ acting on one of the first and second casings or constant force of 100 N acting in any direction relative to the vehicle body.

* * * * *

UNITED STATES PATENT AND TRADEMARK OFFICE
CERTIFICATE OF CORRECTION

PATENT NO. : 6,173,800
DATED : January 16, 2001
INVENTOR(S) : Pieter Delfina Steenackers, et al.

It is certified that error appears in the above-indentified patent and that said Letters Patent is hereby corrected as shown below:

On the title page, item [75] Inventors, should read--

Pieter Delfina Steenackers, Heverlee; John W. Jörg Alexnat, Vliermaal, both of (BE) --.

Signed and Sealed this

Eighth Day of May, 2001

Attest:

NICHOLAS P. GODICI

*Attesting Officer*    *Acting Director of the United States Patent and Trademark Office*